3,053,878
PENTAERYTHRITOL PHOSPHITE ESTERS
Lester Friedman, New York, N.Y., and Henry Gould, West Orange, N.J., assignors to Weston Chemical Corporation, Newark, N.J., a corporation of New Jersey
No Drawing. Filed May 23, 1961, Ser. No. 111,899
22 Claims. (Cl. 260—461)

This application is a continuation-in-part of application, Serial No. 56,129, filed September 15, 1960.

It is an object of the present invention to prepare novel phosphites.

Another object is to prepare polymeric phosphites effective as flame proofing agents, stabilizers, plasticizers.

A further object is to prepare fiber forming polymeric phosphites.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by reacting the appropriate 3,9-dialkoxy or diaryloxy 2,4,8,10-tetraoxa - 3,9 - diphosphaspiro(5,5) undecane (hereinafter called "phosphorus compound") with the appropriate dihydric alcohol or dihydric phenol. The mol ratio in which the two reactants are reacted is 1:1. However, the reactants are not necessarily employed in the ratio of 1:1 but instead the mol ratio of the phosphorus compound to dihydric alcohol or dihydric phenol can be 3:2; 5:4; 6:5; 20:19; 202:200; 1:1; 200:202; 19:20; 5:6; 4:5 or 3:2, for example. In general the closer the mol ratio of the two reactants is to unity the higher the molecular weight of the polymer formed. The molecular weight can also be controlled by adding monofunctional reactants, e.g., monohydric alcohols such as decyl alcohol or stearyl alcohol or phenols such as phenol, cresol (o, m or p isomer), nonyl phenol or the like in place of part of the dihydric phenol or alcohol and carrying out the reaction below the distillation temperature of such reactant.

The phosphorus compound and the dihydric alcohol or dihydric phenol are preferably reacted in the presence of a dialkyl phosphite, a diaryl phosphite, or a dihaloaryl phosphite as set forth in the parent application. Although other catalysts can be employed such as alkali metal alcoholates and phenolates, preferably 0.1 to 1% of catalyst is employed based on the phosphorus compound (spiro compound). As examples of catalysts there can be used diphenyl phosphite, didecyl phosphite, phenyl decyl phosphite, di(2-methyl-phenyl) phosphite, di(4-dodecylphenyl) phosphite, di(2-chlorophenyl) phosphite, di(2,4-dimethylphenyl) phosphite, di(4-bromophenyl) phosphite, diethyl phosphite, dicyclohexyl phosphite, dioctadecyl phosphite, sodium phenolate, sodium decylate, potassium cresylate, sodium ethylate, sodium octadecanolate, etc. For convenience, diphenyl phosphite and similar diaryl phosphites are employed as they are prepared by controlled and catalyzed hydrolysis of triaryl phosphites. The phenol formed in the hydrolysis is usually allowed to remain since it is inert and, in fact, is usually one of the by-products in the present transesterification.

The novel polymers are usually prepared by distilling out the monohydric alcohol or phenol produced in the transesterification of the spiro phosphorus compound and the dihydric alcohol or dihydric phenol. Preferably, the reaction is carried out at reduced pressure, e.g., 10–20 mm. The reaction can be carried out at atmospheric or preferably subatmospheric pressures, e.g., 0.1–100 mm.

The novel polymers can also be prepared by reacting a mixture of (1) the dihydric alcohol or dihydric phenol, (2) a trialkyl phosphite or triaryl phosphite or mixed alkyl aryl phosphite, and (3) pentaerythritol in the presence of the catalysts set forth above, preferably the diaryl or dialkyl phosphites. As reactant (2) there can be used triphenyl phosphite, tricresyl phosphite, tristearyl phosphite, tridecyl phosphite, triethyl phosphite, monodecyl diphenyl phosphite, didecyl monophenyl phosphite, etc.

As the phosphorus compound in the preferred procedure there can be used any of the tetraoxadiphosphaspiro compounds which are mentioned in our parent application. Typical examples include 3,9-diphenoxy-2,4,8,10-tetraoxa-3,9 - diphosphaspiro(5,5) undecane (diphenyl pentaerythritol diphosphite),
3,9-di(decyloxy) 2,4,8,10-tetraoxa - 3,9 - diphosphaspiro (5,5) undecane,
3,9-di(isodecyloxy) 2,4,8,10-tetraoxa-3,9 - diphosphaspiro (5,5) undecane,
3,9-di(methyloxy)-2,4,8,10-tetraoxa-3,9 - diphosphaspiro (5,5) undecane,
3,9-di(ethyloxy) 2,4,8,10-tetraoxa-3,9 - diphosphaspiro (5,5) undecane,
3,9-di(octadecyloxy)-2,4,8,10-tetraoxa3,9 - diphosphaspiro (5,5) undecane,
3-phenyloxy-9-isodecyloxy-2,4,8,10-tetraoxa-3,9 - diphosphaspiro(5,5) undecane,
3,9-di-p-tolyloxy-2,4,8,10-tetraoxa - 3,9 - diphosphaspiro (5,5) undecane,
3,9-di(methoxyethoxy)-2,4,8,10-tetraoxa-3,9 - diphosphaspiro(5,5) undecane, etc.

There can also be used any of the spiro compounds set forth in Hechenbleikner Patent 2,847,443 or Gould Patent 2,961,454. The monohydric alcohol or phenol should have a lower boiling point than the dihydric alcohol or phenol which is to be reacted.

As the dihydric alcohol there can be used any such material which has at least four atoms in the chain separating the OH groups, e.g., diethylene glycol, dipropylene glycol, tri- and polypropylene glycols, decamethylene glycol, hexamethylene glycol, triethylene glycol, thiodiglycol, sulfonyl diglycol, diethanolamine, N-methyl diethanolamine, 4,4'-isopropylidene bis-(phenoxyisopropylalcohol) and other ethylene and propylene oxide adducts of dihydric phenols, N-butyl diethanolamine, N-phenyl diethanolamine, N-octadecyl diethanolamine, pentamethylene glycol, isosorbide, 1,12-octadecanediol, tetrachloro 1,4-butanediol, dibromo 1,4-butenediol, dichloro dibromo 1,4-butanediol, 1,6-hexylene glycol, xylylene glycol.

A difference in reaction has been noted between primary and secondary diols such as diethylene glycol and dipropylene glycol or isosorbide or 1,4-cyclohexane dimethanol. In all the cases investigated the primary alcohol functions undergo cross-linking reactions far more easily than the secondary alcohol analogs. The reason for cross-linking is a result of cleavage of the pentaerythritol ring so that a cross-linking junction is formed instead of the linear spiro ring system. The tendency toward cross-linking is temperature dependent.

As the dihydric phenol there can be used bisphenol A and other di(hydroxyaryl) alkylidenes such as di(4-hydroxy-3-methylphenyl) dimethyl methane, di(4-hydroxy-3-methylphenyl) methyl methane, di(p-hydroxyphenyl) methyl ethyl methane, di(4-hydroxy-3-methylphenyl) phenyl methane, di(4-hydroxyphenyl) methane, di(4-hydroxyphenyl) sulfone, di(4-hydroxyphenyl) sulfide, di(4-hydroxyphenyl) sulfoxide, di(3-hydroxyphenyl) dimethyl methane, tetrabromo bisphenol A, tetrachloro bisphenol A, 4,4'-methylene bis-(2-methyl-6-t-butylphenol) di(4-hydroxyphenyl) ether, resorcinol, di-(3-chloro-4-hydroxyphenyl) dimethyl methane, hydroquinone and dihydroxydiphenyl.

The end groups can be those of the glycol or dihydric phenol employed or can be those of the starting spiro compound or can be obtained from added chain stoppers.

The recurring structural unit of the product is

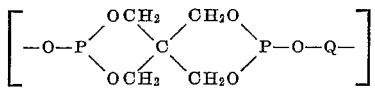

where Q is the alkylene or arylene portion of a dihydric alcohol or dihydric phenol.

When Q is the residue of a dihydric alcohol it preferably has the formula

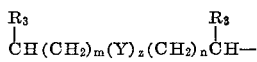

when $m$ is zero or an integer, preferably not over ten, Y is S, O, $NR_2$, $(OCH_2CH_2O)_x$,

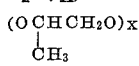

or $CH_2$, $n$ is zero or an integer, preferably not over 10, $z$ is zero or one, $R_2$ is hydrogen, alkyl or aryl, $R_3$ is H or $CH_3$ and X is an integer of at least one. Another preferred grouping for Q is the haloaliphatic hydrocarbon group. The halogen can be chlorine, bromine, or fluorine. As indicated above, there should be at least four atoms between the open valences in the above formula.

When Q is the residue of a dihydric phenol it preferably is arylene, di(aryl) alkylidene, haloarylene, di(haloaryl)alkylidene, di(aryl)sulfide, di(aryl)sulfone, di(aryl)-sulfoxide, di(aryl)ether. The halogen can be chlorine, bromine or fluorine.

Copolymers can be prepared where a portion of the Q groups are aliphatic and the remainder aromatic. The end groups can be hydrogen, alkyl, aryl, haloalkyl, haloaryl, alkoxyalkyl, aryloxyalkyl, polyalkoxyalkyl, etc. In fact any esterifiable end group can be present.

While the monomers are included in the compounds of the present invention, preferably a polymer is prepared. The preferred polymers have a molecular weight of at least 1,000 and can be as high as 20,000 or higher. Lower molecular weight polymers can be prepared. The monomers are useful to prepare the polymers and both the monomers and polymers are useful as antioxidants for polyethylene, polypropylene, polystyrene and other polyolefins.

The polymers in many instances are either self-extinguishing or completely non-burning and are useful as fibers, as components in wirecoating, as potting compounds, as films and as plastic foams.

The polymers (and monomers) of the present invention are also useful as stabilizers to prevent oxidation and depolymerization of materials such as irradiated polyethylene, nylon, polyesters, e.g. Dacron (polyethylene terephthalate), vinyl chloride polymers, vinyl acetate polymers, acrylates and methacrylates (e.g. polymethyl methacrylate and polyethyl acrylate), Acrilan (acrylonitrile copolymers), polyurethanes, etc. Furthermore the polymers of the present invention are useful as flame retardants, dyeing assist agents, anti-static agents, lubricating additives. The phosphorus polymers are compatible with cellulose based products such as rayon, cotton, paper, polyvinyl butyral resins, Delrin, (polymerized oxymethylene), etc. and can serve as flame proofing and/or stabilizers for such materials. The monomers and polymers can be employed as plasticizers for vinyl chloride and other plastics. For flame proofing purposes there can be incorporated a small amount, e.g. 10% of the polymer, e.g. of Example 18, into a film of polyvinyl chloride, polyethylene, polypropylene or cellulose acetate of 0.2–10 mil thickness.

The polymers in general are solids of exceptional clarity and usually completely colorless.

Unless otherwise stated all parts and percentages are by weight.

*Example 1*

Diphenyl pentaerythritol diphosphite _____ mol __ 1
Diethylene glycol _____ do ____ 1
Diphenyl phosphite _____ grams __ 2

The above mixture was heated to 110–120° C. at 10–15 mm. pressure and the phenol was distilled off until about 170 grams were collected. The calculated molecular weight of the residue was about 1000. This product has essentially the formula

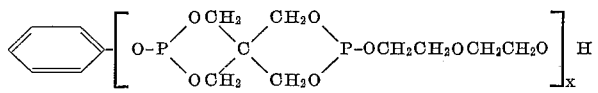

where X indicates the number of repeating units (about an average of 3.5) for a molecular weight of 1000.

*Example 2*

Example 1 was repeated replacing the diphenyl pentaerythritol diphosphite by 1 mol of didecyl pentaerythritol diphosphite and heating at 10–15 mm. pressure until the calculated molecular weight of the polymer in the pot had increased to about 20,000.

*Example 3*

Example 1 was repeated replacing the diethylene glycol by 1 mol of thiodiglycol (Kromfax solvent). There was a violent reaction to a gel-like product. Only 60–65% of the theoretical amount of phenol could be recovered.

*Example 4*

Example 1 was repeated replacing the diethylene glycol by 1 mol of N-methyl diethanolamine. The reaction proceeded with explosive violence.

*Example 5*

Diphenyl pentaerythritol diphosphite _____ 770 gms. (2.025 mols).
Bisphenol A [di-(4-hydroxyphenyl)-dimethyl methane] _____ 456 gms. (2.000 mols).
Diphenyl phosphite _____ 2 gms.

The materials were mixed and as the temperature was raised to 100° C., the mixture became liquid. The phenol formed was distilled off at a pot temperature which increased from 105–240° C. at a pressure of 15 mm. At this point the material in the pot was so viscous it could not be stirred. The phenol recovered was 347 gm. Theory for complete reaction is 376 gm. The yield was 874 gm. Theory is 850 gm. The excess yield over theory is due to the presence of a small amount of entrapped phenol. The product was clear, light amber, very hard, brittle solid which did not support combustion. The product had terminal phenyl groups and a molecular weight of approximately 20,000.

*Example 6*

Diphenyl pentaerythritol diphosphite _____ 767 gms. (2.018 mols).
Diethylene glycol _____ 202 gms. (1.905 mols).
Diphenyl phosphite _____ 4 gms.

The mixture was heated at reduced pressure and the phenol formed distilled at 10 mm. to a pot temperature of 225° C. There was recovered 346 gm. of phenol (339 theory). The product was purged with nitrogen for 0.5 hour at 215–225° C. at 10 mm. and 14 gm. more of distillate was recovered. There was recovered from the pot 600 gms. of a clear, pale, very elastic, gummy solid that became more fluid but did not melt at 180° C. The product also would not support combustion. It had a molecular weight of approximately 6300.

Example 7

Diphenyl pentaerythritol diphosphite _____mols__ 2.000
Bisphenol A _____do____ 2.100
Diphenyl phosphite _____gms.__ 2

The mixture was heated and the phenol formed removed by distillation to a temperature of 235° C. at 10 mm. Then nitrogen was blown through for 1 hour at 10 mm. and 230-235° C. There was recovered 352 gms. of phenol distillate. The pot residue was a hard glassy clear, very light amber solid of molecular weight approximately 8600, that did not support combustion.

Example 8

Diphenyl pentaerythritol diphosphite _____ 760 gms. (2.02 mols).
Diethylene glycol _____ 159 gms. (1.50 mols).
Diphenyl phosphite _____ 3 gms.

The mixture was heated and 156 gms. of phenol distilled off at 15 mm. at a pot temperature of 130° C. Then 134 gms. more phenol was removed as the temperature was raised to 205° C. at 5 mm. A further 9 gms. of phenol were removed while nitrogen was blown through the mixture in the pot at 205° C. and 5 mm. The product was filtered at 140° C. and 566 grams of product recovered. An additional 46 gms. was lost in the filtration. (Theory is 637 gms. of product.) The product was clear glassy, semisolid having a molecular weight of approximately 1200.

Example 9

Diphenyl pentaerythritol diphosphite _____ 760 gms. (2.02 mols).
Diethylene glycol _____ 212 gms. (2.025 mols).
Diphenyl phosphite _____ 3 gms.

The mixture was heated and 361 gms. of phenol were removed at a temperature up to 195° C. at 5 mm. The residue was a very tough, clear, glassy, elastic, sticky, solid having a molecular weight of approximately 28,000.

Example 10

Example 5 was repeated replacing the bisphenol A by the same molar amount of di(4-hydroxyphenyl) sulfone and the high molecular weight product recovered from the pot.

Example 11

Diphenyl pentaerythritol diphosphite _____ 780 gms. (2.07 mols).
Dipropylene glycol _____ 268 gms. (2.00 mols).
Diphenyl phosphite _____ 3 gms.

This mixture was heated to 100° C. for 0.5 hour. Then vacuum distillation was started and continued until a temperature of 205° C. at 10 mm. was reached. Nitrogen was sparged through the batch for 1.5 hours at 205-215° C. and 10 mm.

There was recovered 379 gms. of phenol [theoretical is 376 gms. (4 mols)]. The pot residue was 668 gms. (theory 572 gms.). The pot residue when warm was a tacky liquid that could be drawn to very fine tacky filaments. At 70-90° C. the product was a viscous liquid. At room temperature it was a clear, tacky, semi-solid glass that would barely flow.

Example 12

Diphenyl pentaerythritol diphosphite _____ 780 gms. (2.07 mols).
Polypropylene glycol 425 _____ 850 gms. (2.00 mols).
Diphenyl phosphite _____ 3 gms.

The batch was distilled to a pot temperature of 210° C. at 10 mm. Nitrogen was blown through for 1.5 hours at 205-215° C. at 10 mm. The theoretical amount of phenol (376 gms.) and the theoretical weight of pot residue (1254 gms.) were obtained. The pot residue was a clear, almost water-white, very viscous liquid.

Example 13

The same product as that obtained in Example 5 was obtained by reacting a mixture of bisphenol A, 456 gms. (2.00 mols), triphenyl phosphite, 1240 gms. (4.00 mols), pentaerythritol, 272 gms. (2.0 mols), in the presence of 7 gms. of diphenyl phosphite as a catalyst. The conditions of reaction were the same as those in Example 5. The product was a hard, clear, colorless quite brittle solid. Fibers could be drawn from the melt.

Example 14

Bisphenol A _____ 342 gms. (1.5 mols).
Triphenyl phosphite _____ 1240 gms. (4.00 mols).
Pentaerythritol _____ 272 gms. (2.00 mols).

These materials were reacted in the presence of 7 gms. of diphenyl phosphite using the same reaction conditions as in Example 5. There were obtained 1036 grams of phenol (1024 gms. is theory). The residue solidified to a hard, clear, colorless solid, molecular weight about 1600. The end groups were assumed to be phenyl.

Example 15

Isosorbide _____ 290 gms. (2.0 mols).
Diphenyl pentaerythritol diphosphite _____ 780 gms. (2.07 mols).
Diphenyl phosphite (catalyst) __ 3.0 gms.

The mixture was heated in vacuo and the phenol distilled. The mixture began to gel when the temperature reached 193° C. Phenol in an amount of 332 gms. (88% of theory) had distilled. The residue was a sticky gel which, on cooling to room temperature, solidified to a brittle, clear, colorless solid.

Example 16

Tetrachlorobisphenol A _____ 366 gms. (1.0 mol).
Diphenyl pentaerythritol diphosphite _____ 390 gms. (1.04 mols).
Diphenyl phosphite _____ 3.0 gms.

This mixture was distilled in vacuo to 210° C. and 10 mm. About one-half the theoretical amount of phenol was recovered. Further heating to 240-250° C. with a nitrogen purge for several hours gave a total of 171 gms. of phenol (91% theory). The polymer flowed at 150-170° C. and is a dark amber, brittle solid at room temperature.

Example 17

1,12-hydroxystearyl alcohol ____ 106 gms. (1.00 mol).
Diphenyl pentaerythritol diphosphite _____ 760 gms. (2.02 mols).
Diphenyl phospite _____ 3 gms.

This mixture was heated in vacuo as in Example 5. There were recovered 378 gms. of phenol (100% theory). The polymer at elevated temperature was a very pale yellow, viscous liquid which solidified to a glass at low temperatures, $n_D^{22}$ 1.4872.

Example 18

Diethylene glycol _____ 106 gms. (1.00 mol).
Bisphenol A _____ 228 gms. (1.00 mol).
Diphenyl pentaerythritol diphosphite _____ 780 gms. (2.07 mols).
Diphenyl phosphite _____ 3.0 gms.

The mixture was heated in vacuo. At 200° C. and 15 mm. the polymer had reached a consistency that could not be further stirred. The polymer solidified to a hard, brittle, clear, colorless solid. Phenol in an amount of 353 gms. (91% theory) also was recovered. There appeared to be a significant amount of cross-linking.

Example 19

A mixture of 208 gms. (2.0 mols) of 1,5-pentanediol and 840 gms. (2.2 mols) of diphenyl pentaerythritol diphosphite were heated in vacuo in the presence of 3 gms.

of diphenyl phosphite. The reaction stopped before gellation when 262 gms. (70% of theory) of phenol had distilled over.

*Example 20*

Resorcinol _____ 174 gms. (1.58 mols).
Diphenyl pentaerythritol diphosphite _____ 600 gms. (1.60 mols).
Diphenyl phosphite _____ 2 gms.

This mixture was heated in vacuo as described in Example 5. Phenol was recovered in essentially quantitative yield. The reaction product was a clear, tough, solid polymer, molecular weight about 30,000.

*Example 21*

Tetrachlorobutanediol-1,4 _____ 343 gms. (1.50 mols).
Diphenyl pentaerythritol diphosphite _____ 575 gms. (1.53 mols).
Diphenyl phosphite _____ 3 gms.

This mixture was heated in vacuo. The final stripping temperature was 220° C. at 10 mm. The yield of phenol was essentially quantitative. The product was a dark brown, brittle resin, M.P. 150–180° C. It was an excellent flame retardant and would not burn or support combustion.

*Example 22*

4,4'-isopropylidenedicyclohexanol
  (hydrogenated bisphenol A) __ 480 gms. (2.00 mols).
Diphenyl pentaerythritol
  diphosphite _____ 780 gms. (2.07 mols).
Diphenyl phosphite _____ 5 gms.

This mixture was heated to a final stripping temperature of 220° C. at 10 mm. The yield of phenol was essentially quantitative. The polymer was a highly refractive, exceptionally clear, hard, brittle solid, M.P. 180–190° C., molecular weight about 30,000.

*Example 23*

The process of Example 22 was repeated substituting the same molar amount of 1,4-cyclohexanedimethanol for the hydrogenated bisphenol A. The product gelled when about 90% of the theoretical amount of phenol had distilled.

*Example 24*

Substitution of the hydrogenated bisphenol A of Example 22 by the same molar amount of 1,4-butenediol resulted in a violent reaction. Care had to be taken to prevent the reaction terminating in an explosion.

*Example 25*

Dow resin 565 (a commercial grade of 4,4'-isopropylidene bisphenoxyisopropyl alcohol, average molecular weight 360 vs. theor. molecular weight 242. The higher average molecular weight is probably a result of over hydroxypropylation. The compound is prepared from bisphenol A and two mols of propylene oxide). 720 grams (2 mols), diphenyl pentaerythritol diphosphite 805 grams, (2.1 mols) and diphenyl phosphite 6.6 grams (catalyst), were heated in vacuo in an apparatus suitable for distillation etc. Distillation of phenol commenced at 100° C. (pot temperature) at 3 mm. pressure, and continued until 368 grams were collected (pot temperature 175° C.) whereupon the rate of distillation was very slow. The pot temperature was gradually raised to 235° C. with concurrent nitrogen purging (5 mm. pressure). Additional phenol (38 grams) was collected for a total of 406 grams, approximately 100% of theory. At 235° C. the polymer was tough, and elastic with very good recovery. When cold, a brittle, clear, hard resin is formed. Yield 1120 grams.

*Example 26*

4,4' - methylene bis - (2-methyl-6-t-butylphenol), 515 grams (1.5 mols), diphenyl pentaerythritol diphosphite, 580 grams (1.575 mols), and diphenyl phosphite 5 grams (catalyst) were heated in vacuo to effect reaction. No phenol distilled from the reaction mixture unless nitrogen purging was employed. Conditions for reaction were rather severe: 190–210° C. (5–10 mm. pressure) nitrogen purging. Even so, the rate of phenol formation was exceedingly slow. Polymerization was discontinued when 215 grams of phenol were collected, about 80% of theory. The product was a hard brittle resin.

The increased steric hindrance about the phenolic group is responsible for the difficulty of reaction. It is remarkable that reaction did indeed occur. The product is of interest since it has more resistance towards hydrolysis than some of the other products.

*Example 27*

TETRABROMO BISPHENOL A PENTAERYTHRITOL
DIPHOSPHITE POLYMER

Tetrabromo bisphenol A, 544 grams (1 mol), diphenyl pentaerythritol diphosphite, 410 grams (1.05 mols), and diphenyl phosphite 3.0 grams (catalyst) were heated together with stirring in vacuo (10 mm. Hg pressure) and the phenol was distilled out as formed. At a terminal temperature of 205° C. only 25% of the theoretical amount of phenol was obtained. The reaction mixture was heated to 245–255° C. and swept with nitrogen (10 mm. Hg pressure) to help facilitate phenol removal. Heating and stirring were maintained at 250° C. (about 30 minutes) until this became impracticable due to the viscosity of the mixture. A total of 169 grams of phenol were collected (theory 188 grams). Yield of polymer product 781 grams (765 grams theoretical).

The steric hindrance resulting from the bulky bromine atoms slow down the rate of the transesterification and the subsequent polymerization. However, a good polymer was obtained. It is most interesting that under the conditions of the transesterification reaction these bromine atoms are apparently completely unreactive.

This compound is useful in flame retarding plastics, etc.

*Example 28*

Diphenyl pentaerythritol
  diphosphite _____ 760 gms. (2.00 mols).
Bisphenol A _____ 342 gms. (1.50 mols).
Diphenyl phosphite _____ 3 gms.

This mixture was heated and the phenol removed at a temperature of 205° C. at 5 mm. until no more phenol could be distilled. The residue in the pot was a colorless glass which melted above 150° C. The molten glass was fiber forming as was demonstrated by dipping a glass rod into the molten product and drawing out fibers when the rod was removed. The product had a molecular weight of about 1650.

What is claimed is:

1. An organic phosphite ester having the recurring structural unit of the formula

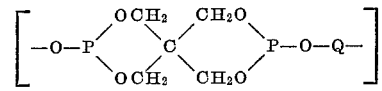

where Q is selected from the group consisting of the alkylene residue of a dihydric alcohol, the arylene residue of a dihydric phenol, and the halo substituted derivatives thereof.

2. A phosphite according to claim 1 having a molecular weight of at least 1000.

3. A phosphite according to claim 2 where Q is the residue of a dihydric alcohol.

4. A phosphite according to claim 2 where Q is the residue of a dihydric phenol.

5. An organic phosphite ester having the recurring structural unit of the formula

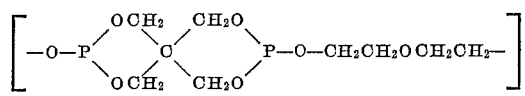

6. An organic phosphite ester having the recurring structural unit of the formula $$\left[-O-P\begin{matrix}OCH_2\\ \\OCH_2\end{matrix}\begin{matrix}CH_2O\\O\\CH_2O\end{matrix}P-O-(CH_2CH_2O)_xCH_2CH_2-\right]$$

where X is an integer of at least two.

7. An organic phosphite ester having the recurring structural unit of the formula $$\left[-O-P\begin{matrix}OCH_2\\ \\OCH_2\end{matrix}\begin{matrix}CH_2O\\O\\CH_2O\end{matrix}P-O-L-\right]$$

where L is selected from the group consisting of phenylene, biphenylene, a radical having the formula $$M-\underset{R_5}{\overset{R_4}{C}}-M$$

where M is a divalent aromatic radical bonded to the divalent carbon atom of the alkylidene group through one of its ring carbon atoms and bonded through another ring carbon atom to an oxygen atom attached to a phosphorus atom and $R_4$ and $R_5$ are selected from the group consisting of hydrogen and lower alkyl, phenylenethiophenylene, phenylenesulfonylphenylene, phenylenesulfoxyphenylene and phenyleneoxyphenylene.

8. An organic phosphite ester having the recurring structural unit of the formula $$\left[-O-P\begin{matrix}OCH_2\\ \\OCH_2\end{matrix}\begin{matrix}CH_2O\\O\\CH_2O\end{matrix}P-O-\bigcirc-\underset{CH_3}{\overset{CH_3}{C}}-\bigcirc-\right]$$

9. A process of preparing an organic phosphite ester comprising transesterifying a 2,4,8,10-tetraoxa-3,9-diphosphaspiro(5,5) undecane having as substituents in the 3 and 9 positions a member of the group consisting of hydrocarbonoxy and alkoxyalkoxy with a member of the group consisting of unsubstituted glycols, polyethylene glycols, propylene, glycol, polypropylene glycols, thiodiglycol, diethanolamine, N-hydrocarbon substituted diethanolamines, halogen substituted glycols, sulfonyl diglycol, di(hydroxyaryl)alkylidenes, wherein the aryl is an unsubstituted aryl of the benzene series, di(hydroxyhalophenyl)alkylidenes, dihydroxydiphenyl, monocyclic dihydric phenols, di(hydroxyphenyl)sulfones, di(hydroxyphenyl)sulfides and di(hydroxyphenyl)sulfoxides.

10. A process according to claim 9 wherein the transesterification is carried out in the presence of a dihydrocarbon phosphite having the formula $$\begin{matrix}R_1O\\ \\R_2O\end{matrix}P-OH$$

where $R_1$ and $R_2$ are selected from the group consisting of an alkyl group having up to 18 carbon atoms, cyclohexyl, phenyl, lower alkylphenyl and halophenyl as a catalyst.

11. A process of preparing an organic phosphite ester comprising transesterifying a 3,9-diaryloxy-2,4,8,10-tetraoxa-3,9-diphosphaspiro(5,5) undecane wherein the aryloxy is selected from the group consisting of phenoxy and tolyloxy with diethylene glycol.

12. A process according to claim 11 wherein the diaryloxy is diphenoxy.

13. A process of preparing an organic phosphite ester comprising transesterifying a 3,9-diaryloxy-2,4,8,10-tetraoxa-3,9-diphosphaspiro(5,5) undecane wherein the aryloxy is selected from the group consisting of phenoxy and tolyloxy with di-(4-hydroxyphenyl)dimethylmethane.

14. A process according to claim 11 wherein the diaryloxy is diphenyoxy.

15. An organic phosphite ester according to claim 1 in the form of a fiber.

16. An organic phosphite ester according to claim 8 in the form of a fiber.

17. A method of forming a fiber comprising drawing the organic phosphite ester of claim 8 to form a fiber.

18. A process of preparing an organic phosphite polymer comprising condensing a mixture of (1) a member of the group consisting of dihydric alcohols and dihydric phenols, (2) a tri-hydrocarbon phosphite wherein the hydrocarbon groups are selected from the group consisting of phenyl, lower alkylphenyl and alkyl and (3) pentaerythritol and removing the monohydroxy hydrocarbon formed.

19. An organic phosphite ester having the recurring structural unit of the formula $$\left[-O-P\begin{matrix}OCH_2\\ \\OCH_2\end{matrix}\begin{matrix}CH_2O\\O\\CH_2O\end{matrix}P-OCHCH_2OCH_2CH_2-\right]$$
$$\qquad\qquad\qquad\qquad\qquad\overset{|}{CH_3}\;\;\overset{|}{CH_3}$$

20. An organic phosphite ester having the recurring structural unit of the formula $$\left[-O-P\begin{matrix}OCH_2\\ \\OCH_2\end{matrix}\begin{matrix}CH_2O\\O\\CH_2O\end{matrix}P-O\left(\underset{CH_3}{\overset{|}{CHCH_2}}-O\right)_x\underset{CH_3}{\overset{|}{CHCH_2}}-\right]$$

where X is an integer of at least two.

21. An organic phosphite ester containing the recurring structural unit of the formula $$\left[-O-P\begin{matrix}OCH_2\\ \\OCH_2\end{matrix}\begin{matrix}CH_2O\\O\\CH_2O\end{matrix}P-O\langle H\rangle-\underset{CH_3}{\overset{CH_3}{C}}-\langle H\rangle-\right]$$

wherein the H in the ring designates that the ring is completely hydrogenated.

22. An organic phosphite according to claim 1 wherein there are at least 4 atoms in the chain separating the hydroxyl groups.

References Cited in the file of this patent
UNITED STATES PATENTS 2,957,856    Guest et al. _____ Oct. 25, 1960
2,961,454    Gould et al. _____ Nov. 22, 1960

OTHER REFERENCES

Allen et al.: J. Am. Chem. Soc., 1955 (vol. 77, p. 2874).